No. 793,711. Patented July 4, 1905.

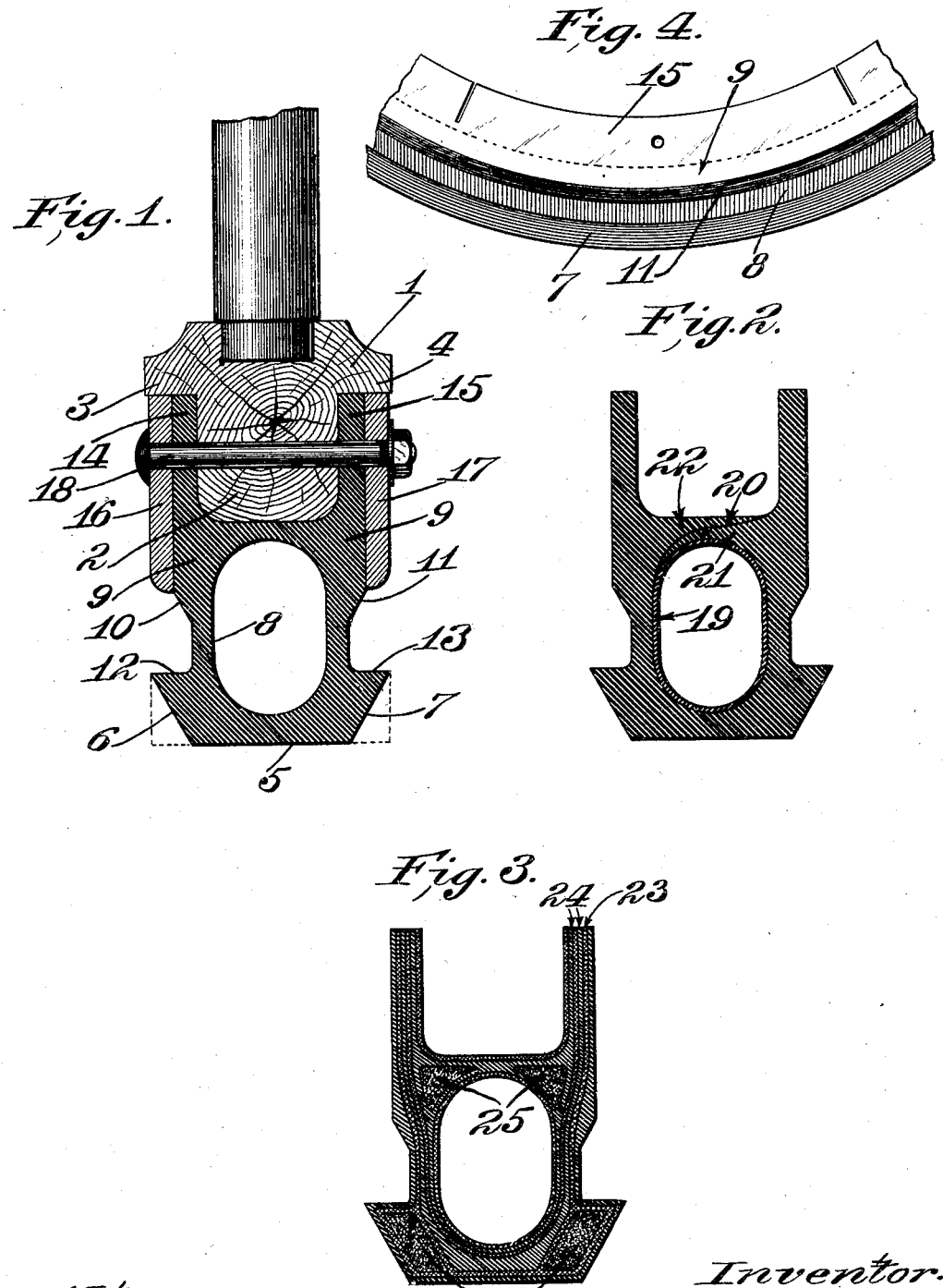

UNITED STATES PATENT OFFICE.

JOHN K. BRODERICK, OF ST. LOUIS, MISSOURI.

PNEUMATIC TIRE.

SPECIFICATION forming part of Letters Patent No. 793,711, dated July 4, 1905.

Application filed July 16, 1904. Serial No. 216,830.

*To all whom it may concern:*

Be it known that I, JOHN K. BRODERICK, a citizen of the United States, residing at St. Louis, Missouri, have invented a certain new and useful Improvement in Pneumatic Tires, of which the following is a full, clear, and exact description, such as will enable others skilled in the art to which it appertains to make and use the same, reference being had to the accompanying drawings, forming part of this specification, in which—

Figure 1 is a vertical cross-sectional view through a rim and tire constructed in accordance with my invention, the tire being of the single-tube type. Fig. 2 is a cross-sectional view through a tire modified for an inner tube. Fig. 3 is a further modified form of tire, and Fig. 4 is a side elevational view of a portion of a tire.

This invention relates to pneumatic tires; and it is particularly designed for motor-vehicles, although the tire may be modified for suitable application to other wheels.

One of the principal objects of the invention is to provide a tire which will possess tractional qualities to a maximum degree, so that the liability of the tire slipping, due to side thrusts in rounding curves or from other causes, will be avoided.

Another object is to provide an auxiliary tread for the tire which will exert itself when the primary tread is out of contact with the earth.

Other objects and advantages, as well as the novel details of construction of this invention, will be specifically referred to hereinafter, it being understood that changes in the form, proportion, and minor details of construction may be resorted to without departing from the principle or spirit or sacrificing any of the advantages thereof.

The preferred forms of my invention are presented in the following description.

In the form illustrated in Fig. 1 I have shown the rim or felly 1 as provided with a central circumferentially-disposed rib 2, from the respective sides of which project flanges 3 and 4, which form shoulders against which the edges of the tire rest. The tire is provided with a flat primary tread 5. The inclined sides 6 and 7 coöperate with the tread 5 and constitute auxiliary treads or faces adapted to contact with the surface of the road or track over which the vehicle is being propelled. These tread-surfaces 6 and 7 are illustrated as diverging from the longitudinal center of the tire in an outward and upward direction. However, I reserve the right to dispose them at any angle with relation to the tread 5 to meet requirements. The tubular portion 8 of the tire is provided with an upper thickened wall and intermediate relatively thin walls. The thickened wall portion 9 is provided with shoulders 10 and 11, which shoulders are adapted to contact with the shoulders 12 and 13 when the tire is deflated, so that even when all atmosphere is excluded from the tire it will possess considerable resiliency, the thin walls of the tire collapsing for this purpose. In order that the tire may be efficiently secured to the rim or felly, I provide the inwardly-disposed flanges 14 and 15, which form a part of the tire, one of said flanges having transverse slits dividing the same into a series of segments, so that the flanged portion of the tire may be readily slipped over the centrally-disposed rib 2 of the felly 1. After the rib 2 is embraced by the flanges said flanges are clamped thereto or clamped to the rib by means of the clamping-rings or circular plates 16 and 17, which may be of suitable metal, said plates being secured by means of the fastening devices indicated as bolts 18. By applying these clamping rings or plates an equal pressure is exerted against the flanges of the tire at all intermediate points, and thus creeping of the tire upon the rim will be prevented. The broad flat tread 5 of the tire will be effective in causing an efficient contact or traction to be maintained between the tire and the track or road upon which the tire is supported.

In order to provide for the side slipping or skidding of the tire, particularly when the vehicle is rounding curves, the secondary tread will contact with the road-surface, which tread may be disposed at any angle with relation to the primary tread. In the event that the short turning of the vehicle in rounding corners or from any other cause the side thrust of the vehicle causes the tread 5 of the tire to leave its track one of the faces 6 and 7 will immediately contact with the track, so as to cause traction to be set up therebetween and prevent any further slipping of the vehicle.

The form of tire illustrated in Fig. 2 conforms in all essential particulars to that illustrated in Fig. 1, the difference being that the tire is modified for an inner tube. In order that the inner tube 19 may be introduced into and removed from the tire, I provide a slit 20, whereby the overlapping tongues 21 and 22 are formed, which tongues will be caused to bind one upon the other when the tire is in place, the manner of fastening said tire to the rim being the same as that employed in the form illustrated in Fig. 1.

In Fig. 3 I have illustrated a form of tire consisting of alternate layers of fabric and rubber, the fabric being saturated with a sufficient proportion of rubber and molded or otherwise shaped into proper form. The outer layers 23 are of canvas or some similar fabric provided with a suitable coating of rubber, and each succeeding alternate layer is of similar material. The intermediate alternate layers are of rubber and are designated by the reference-numeral 24. To provide a maximum amount of resiliency, the tire is formed with cushions of sponge-rubber. The cushions designated by the numeral 25 consist of rings approximately triangular in cross-section, while the cushions designated by the numeral 26 are rhomboidal in cross-section. These cushions are inclosed by rubber and fabric, respectively. This form of tire (illustrated in Fig. 3) is designed particularly for the single-tube type, although it is obvious that it may be modified for an inner tube, if desired. It is estimated that this tire will possess considerable resiliency with the maximum amount of strength and is well adapted to resist the puncturing influence of tacks, glass, nails, &c.

It will be observed that in each tire the same basic principle is involved and that the modifications are in substance the same, the principal difference being in the disposition of the layers of fabric.

Having thus described the invention, what is claimed as new, and desired to be secured by Letters Patent, is—

1. A tire having a broad flat tread-surface, inclined side tread-surfaces adapted to temporarily contact with the road-bed, and parallel securing-flanges to engage the rim of the wheel, one of said flanges being provided with transverse slits; substantially as described.

2. A tire having a broad flat tread-surface, inclined side tread-surfaces adapted to temporarily contact with the road-bed, parallel securing-flanges to engage the rim of the wheel, one of said flanges being provided with transverse slits, and side clamping-rings to secure the flanges to the wheel-rim, the clamping-rings being of greater widths than the widths of the tire-flanges; substantially as described.

3. A pneumatic tire having a broad flat tread-surface, inclined side tread-surfaces adapted to contact with the road-bed when the first-named tread-surface is out of contact therewith, said tread-surfaces being connected to the remaining portion of the tire, and flexible inwardly-collapsible webs which permit the side tread-surfaces to move into contact with the road-bed to prevent skidding; substantially as described.

4. A tire having a broad flat tread-surface, inclined side tread-surfaces adapted to temporarily contact with the road-bed, the edges of the tire at the juncture of the inclined tread-surfaces with the broad flat tread-surface being capable of offering resistance to the tendency of the tire to skid, said tire having side flexible inwardly-collapsible webs to permit the said edges and the inclined tread-surfaces to move into contact with the road-bed; substantially as described.

5. A tire having a broad flat tread-surface, inclined side tread-surfaces adapted to temporarily contact with the road-bed, and parallel securing-flanges to engage the rim of a wheel and side clamping-rings to secure the flanges to the wheel-rim, the clamping-rings being of greater width than the widths of the tire-flanges; substantially as described.

In testimony whereof I hereunto affix my signature, in the presence of two witnesses, this 13th day of July, 1904.

JOHN K. BRODERICK.

Witnesses:
B. F. FUNK,
GEORGE BAKEWELL.